(12) United States Patent  
Frey et al.

(10) Patent No.: US 9,085,738 B2
(45) Date of Patent: Jul. 21, 2015

(54) METHOD AND APPARATUS FOR DRYING SOLID FEEDSTOCK USING STEAM

(75) Inventors: George Frederick Frey, Houston, TX (US); Karthik Subramanyan, Sugarland, TX (US)

(73) Assignee: General Electronic Company, Schenectady, NY (US)

( * ) Notice: Subject to any disclaimer, the term of this patent is extended or adjusted under 35 U.S.C. 154(b) by 635 days.

(21) Appl. No.: 12/559,428

(22) Filed: Sep. 14, 2009

(65) Prior Publication Data

US 2011/0061298 A1 Mar. 17, 2011

(51) Int. Cl.
| | |
|---|---|
| *B01J 7/00* | (2006.01) |
| *C10J 3/72* | (2006.01) |
| *F23K 1/04* | (2006.01) |
| *F23K 3/02* | (2006.01) |
| *F26B 1/00* | (2006.01) |
| *F26B 21/04* | (2006.01) |

(52) U.S. Cl.
CPC ... *C10J 3/72* (2013.01); *F23K 1/04* (2013.01); *F23K 3/02* (2013.01); *F26B 1/005* (2013.01); *F26B 21/04* (2013.01); *C10J 2300/0903* (2013.01); *F23K 2201/10* (2013.01); *F23K 2201/20* (2013.01); *F26B 2200/02* (2013.01); *Y02E 20/16* (2013.01); *Y02E 20/18* (2013.01)

(58) Field of Classification Search
CPC ...... F02C 9/40; C10J 2300/0903; C10J 3/723
See application file for complete search history.

(56) References Cited

U.S. PATENT DOCUMENTS

| | | | | |
|---|---|---|---|---|
| 2,409,304 | A | | 10/1946 | Morrison |
| 4,153,427 | A | * | 5/1979 | Bissett et al. ................. 48/86 R |
| 4,157,245 | A | * | 6/1979 | Mitchell et al. ............. 48/197 R |
| 4,666,463 | A | * | 5/1987 | Stellaccio ................... 48/197 R |
| 4,971,683 | A | * | 11/1990 | Meyer et al. .................. 208/431 |
| 5,953,899 | A | | 9/1999 | Rao et al. |
| 2006/0075682 | A1 | | 4/2006 | Bullinger et al. |
| 2008/0087022 | A1 | * | 4/2008 | Briesch et al. .................. 60/772 |
| 2008/0161428 | A1 | * | 7/2008 | Strait ............................ 518/702 |
| 2008/0202028 | A1 | * | 8/2008 | Tsangaris et al. ................ 48/73 |
| 2010/0024297 | A1 | * | 2/2010 | Suda et al. ........................ 48/61 |
| 2011/0078951 | A1 | * | 4/2011 | Blasiak et al. .................... 48/63 |

FOREIGN PATENT DOCUMENTS

WO   WO 2008107929 A1 * 9/2008

\* cited by examiner

*Primary Examiner* — Imran Akram
(74) *Attorney, Agent, or Firm* — Fletcher Yoder, P.C.

(57) ABSTRACT

Steam may be used to dry feedstock prior to delivery to a gasifier. A steam supply may be delivered to embodiments such as a feedstock dryer. Heat from the steam may then be transferred into the feedstock and used in drying the feedstock. Steam pressures may include pressures from 75 pounds per square inch up to and including 900 pounds per square inch.

9 Claims, 4 Drawing Sheets

METHOD AND APPARATUS FOR DRYING SOLID FEEDSTOCK USING STEAM

BACKGROUND OF THE INVENTION

The subject matter disclosed herein relates to raw material treatment. More specifically, disclosed embodiments of the invention relate to the drying of feedstock by using steam from various plant components.

Fossil fuels, such as coal or petroleum, may be gasified for use in the production of electricity, chemicals, synthetic fuels, or for a variety of other applications. Gasification involves the incomplete combustion of a carbonaceous fuel with limited oxygen at a very high temperature to produce syngas, a fuel containing carbon monoxide and hydrogen, which enables higher efficiency and cleaner emissions than the fuel in its original state.

Different carbonaceous fuels may be gasified with varying success. That is, a lower moisture content value generally indicates that a fuel is more easily combustible and more efficiently gasified. The moisture content value of a material is a measure of the amount of water present in the material. For example, petcoke, which is produced from cracking petroleum, has relatively low moisture content and, therefore, is easily gasified. In contrast, low rank coals and biomass may have high moisture content and are, therefore, difficult to gasify. In some instances, biomass such as corn stalks and switchgrass may contain so much moisture that it becomes too inefficient to gasify the fuel. In addition, high moisture in fuels degrades flowability and causes frequent plugging during handling and conveyance. Possible nuisances include fouling of baghouses and bridging of nozzles. Sufficient moisture must be removed so that the fuel may be reliably conveyed to the reaction furnace. The moisture in the fuel may be removed through heating. However, the energy required for heating the fuel may be cost-prohibitive. Accordingly, it may be desirable to develop methods and systems for more efficiently drying solid fuels, including low rank coals and biomass.

BRIEF DESCRIPTION OF THE INVENTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

In a first embodiment, a system includes a heat exchanger that may transfer heat from a steam, heretofore understood to have a pressure of approximately 75 to 900 pounds per square inch, to a solid feedstock located upstream of a gasifier.

In a second embodiment, a system includes a feedstock dryer which transfers heat from a steam to a solid feedstock located upstream of a gasifier.

In a third embodiment, a method includes receiving steam from a gasifier component and transferring the heat from the steam to a feedstock.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION OF THE INVENTION

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

The disclosed embodiments include systems and methods for drying solid fuel feedstock, including high moisture content feedstock such as biomass and low rank coals. Solid fuel feedstock may have its moisture removed through evaporation by the application of heat. Unfortunately, the drying of solid fuel feedstock may use approximately 50-100 million btu/hr depending on the solid feedstock flow rate and the amount of drying required. Moreover, the drying of high moisture content feedstock uses additional energy because the energy input is proportional to the required drying amount. The disclosed embodiments may be used to more efficiently dry feedstock, including high moisture content feedstock, by reusing energy sources from existing plant components. In general, steam may be reused from existing components of an IGCC plant (e.g., the sulfur recovery unit and the water-gas shift reactor) and may be redirected to provide heat for the drying of the feedstock. Medium pressure steam may be ideal for use in feedstock drying operations, because the steam contains sufficient thermal energy for drying and the thermal energy would otherwise be wasted. For example, most existing medium pressure steam sources, such as the sulfur recovery unit and the water-gas shift reactor, would otherwise let down the medium pressure steam to low pressure steam (e.g., steam at below 75 PSIG) for use in other plant components.

These example plant components (e.g., water gas reactor, sulfur recovery unit) require operation at temperatures that generate medium pressure (MP) steam while the fuel drying process may operate at the same temperatures. The MP steam produced has the potential to generate power directly; however, the limited quantity makes this cost prohibitive. In fuel drying, using a higher temperature (e.g., high pressure steam) may be costly because the energy may be better used elsewhere while using a lower temperature (e.g., low pressure steam) may require excessively large equipment due to, for example, thermal pinches on the heat exchanger. Additionally, low temperatures may not result in fuel dried to desired levels. Consequently, the integration of the aforementioned steam-generating components may result in a higher overall plant efficiency. Embodiments of the invention may convert medium pressure steam to low pressure steam, but may use the energy that would have been otherwise lost during the conversion and apply that energy to the drying of feedstock. By redirecting instead of letting down the medium pressure steam, the IGCC plant may be capable of operating at higher energy efficiencies with minimal changes to existing plant components.

Figure 1:
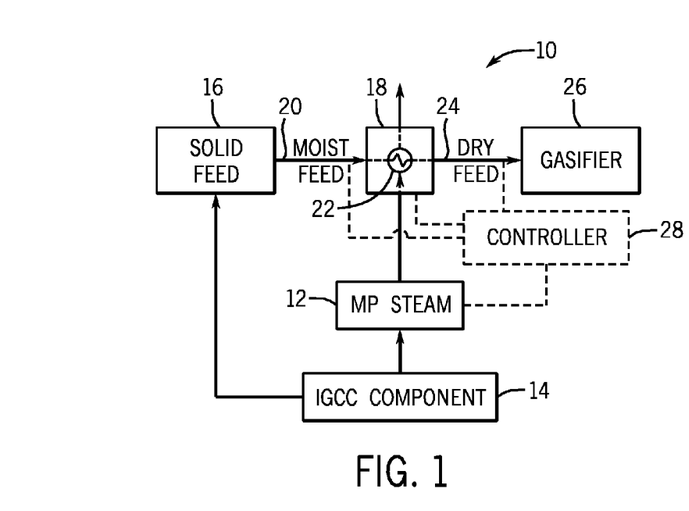
FIG. 1 illustrates a block diagram of an embodiment of a solid feedstock dryer system utilizing steam to dry a solid fuel feedstock without the use of an intermediate fluid.

FIG. 1 depicts a block diagram of an exemplary embodiment of a solid feedstock preparation system 10 that may directly use a medium pressure steam 12 from an IGCC component 14 to dry a solid feedstock 16 in a solid feedstock dryer 18. The IGCC component 14 may include any plant component that produces medium pressure steam 12, for example, a sulfur recovery unit 64 or a water-gas shift reactor 58. In certain embodiments, medium pressure steam 12 from the IGCC component 14 may have a temperature of approximately 320° F. to 534° F. and a pressure of approximately 75 PSIG to 900 PSIG. For example, the medium pressure steam 12 may have a temperature of approximately 450° F. to 520° F. and a pressure of approximately 400 PSIG to 800 PSIG, or an average of approximately 489° F./600 PSIG. In certain embodiments, the medium pressure steam may have a pressure that is between 40%-100% of the pressure of steam produced by the IGCC component. The solid feedstock 16 may include high rank coals, petcoke, low rank coals, biomass (e.g. corn husks, corn cobs, rice husks, sugar cane bagasses, switchgrass), and others. Moisture content in the solid feedstock 16 may be at least greater than approximately 20, 30, 40, 50, 60, 70, 80, or 90 percent.

In one embodiment, the moist solid feedstock 16 may be delivered to the solid feedstock dryer 18 by using a moist feedstock delivery system 20 controlled by a controller 28. The moist feedstock delivery system 20 may be optimized to deliver moist feedstock, for example, by using a posimetric pump, a conveyor belt, a pump, an elevator, a screw feed, and others. Certain embodiments may be used by the solid feedstock dryer 18 to dry the solid feedstock 16. In one embodiment, the feedstock dryer 18 may be controlled by the controller 28 and include a closed vessel such as a drying chamber, a grinder, a pump, a closed passage, a set of tubes, a hollow wall, and a rotating dryer, among others. The dryer 18 may also include one or more passages designed to allow the steam to transfer heat to the solid feedstock as well as a vent used for venting the steam after removal of moisture from the solid feedstock. The dryer 18 may include an inlet coupled to the heat exchanger 22 that allows steam to flow into the dryer 18. An outlet may also be coupled to the dyer 18 to allow for steam to leave the dryer. In some embodiments, the steam leaving the dryer 18 may be recirculated and reused, for example by routing the steam back into the dryer 18 and/or the heat exchanger 22. In other embodiments, the steam may be routed to other IGCC components 14.

The solid feedstock 16 may undergo several processes prior to or during drying; for example, the solid feedstock 16 may be shredded, ground, and/or pulverized. The controller 28 may control the drying process by directing a supply of medium pressure steam 12 into a heat exchanger 22 (e.g., a fin and tube heat exchanger). Heat from the heat exchanger 22 may transfer thermal energy from the medium pressure steam 12 into the closed vessel enclosing the solid feedstock 16, for example, by routing the steam to radiant pipes surrounding the enclosed vessel. The thermal energy may then transfer into the moisture in the solid feedstock 16, thereby evaporating the moisture away from the solid feedstock 16.

In another embodiment, the solid feedstock dryer 18 may include an open vessel such as a vat, or a storage bin, among others. The open vessel surrounding the solid feedstock 16 may collect thermal energy from a supply of medium pressure steam 12 controlled by the controller 28. The open vessel surrounding the solid feedstock 16 may transfer the thermal energy into the solid feedstock 16 and use a similar evaporative method to remove moisture from the solid feedstock 16. In yet another embodiment, the solid feedstock dryer 18 may include a combination of open and closed vessels, which may be used to enclose and/or to surround the solid feedstock 16 for drying. Any embodiments that are capable of using the thermal energy in steam to dry solids may be used. In addition, mechanical mixing/grinding devices may aid in the transfer of heat. The heat may be transferred indirectly by passing the MP steam within the mixing hardware or by heating an intermediate gas that pneumatically aerates the fuel.

In one embodiment, the controller 28 may adjust (e.g., increase or decrease) the heat transferred to the feedstock dryer 18, the speed of a dry feedstock conveyor 24 (e.g., a gas-entrained solids conveyor), and operational characteristics of the gasifier 26. For example, the controller 28 may increase or decrease the flow rate of medium pressure steam 12 through the heat exchanger 22, selectively change between two or more different IGCC components 14 producing different medium pressure steams (e.g., different temperatures), increase or decrease the residence time of the solid feedstock 16 in the feedstock dryer 18, and adjust the grinding of the solid feedstock 16 to vary the moisture level of the feedstock 16 upstream of the gasifier 26. The controller 28 may receive a variety of sensor feedback relating to the IGCC component 14, the medium pressure steam 12, the solid feedstock 16, the feedstock dryer 18, the dry feedstock conveyor 24, and the gasifier 26. For example, the sensor feedback may include the temperature, pressure, moisture content, and other characteristics of the feedstock 16, as well as operational characteristics of the gasifier 26 (e.g., temperature and pressure). If the moisture content is not at a satisfactory level, then the controller 28 may adjust one or more parameters to increase or decrease the moisture content of the solid feedstock 16. Different gasifier types may be able to use fuels containing different moisture levels, for example, certain updraft gasifiers may be able to use fuel with moisture contents of less than approximately 5, 10, 20, 30, 40, 50, or 60 percent. Therefore, the solid feedstock 16 may be considered dry and ready for conveyance at different moisture levels depending on the type of gasifier 26.

In one embodiment, most of the thermal energy in the medium pressure steam 12 may be transferred by the heat exchanger 22 and used to dry the solid feedstock 16. The steam condensate may be further reused (e.g., as feed water for another plant component or as a high pressure cooling medium). The conveyance gas with the evaporated moisture can be reused after moisture has been removed. In another embodiment, only some thermal energy in the medium pressure steam 12 may be transferred by the heat exchanger 22 and used to dry the solid feedstock 16, resulting in low pressure steam which may contain thermal energy for use in other system components. The low pressure steam produced after the use of, for example, a LP flash drum, may be further directed to other plant components (e.g., as steam for use by a low pressure turbine).

Figure 2:
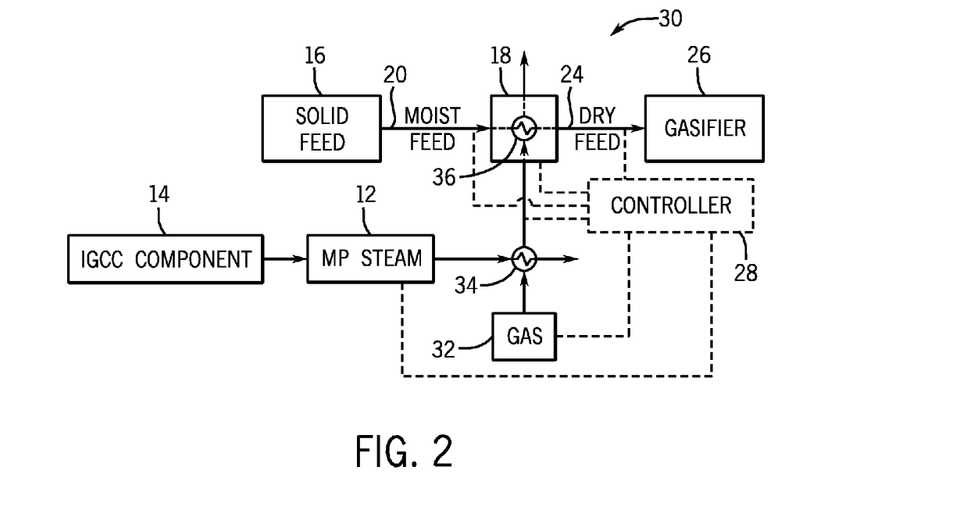
FIG. 2 illustrates a block diagram of an embodiment of a solid feedstock dryer system utilizing medium pressure steam to indirectly dry a solid fuel feedstock via an intermediate heat transfer medium (e.g., gas)

Turning to FIG. 2, the figure illustrates an exemplary embodiment of a solid feedstock preparation system 30 that may indirectly use the medium pressure steam 12 from an IGCC component 14 to dry the solid feedstock 16 in the solid feedstock dyer 18. In this embodiment, the supply of medium pressure steam 12 may be controlled by the controller 28 to heat a supply of an intermediate heat transfer medium (e.g., a gas 32), also controlled by the controller 28. The gas 32 may include any suitable gas, such as nitrogen, air, or any another inert gas. As appreciated, nitrogen and air may be readily available in the IGCC, and thus are particularly useful for the system 30.

The gas 32 may be heated to within approximately 5 to 20° F. (e.g., 10° F.) of the temperature of the medium pressure steam 12 (e.g., between 310° F. to 524° F.) by using a heat exchanger 34. The resulting hot gas 32 may then be used by the solid feedstock dryer 18 to dry the solid feedstock 16 and to convey the feedstock 16 to the gasifier 26. The use of the hot gas 32 as an intermediate thermal energy medium may be beneficial because the hot gas 32 may be substantially free of moisture and may, therefore, use simpler and less costly embodiments to dry the solid feedstock 16. For example, the system 30 may directly flow the gas 32 through and/or around the feedstock dryer 18 with or without a heat exchanger. In other words, the heat exchange may occur directly from the heated gas 32 to the moist feedstock 16, or directly onto a housing of the feedstock dryer 18. In one embodiment, hot gas 32 may include mostly nitrogen which may be routed by the solid feedstock dryer 18 directly onto the solid feedstock 16 in order to dry the solid feedstock 16. In another embodiment, hot gas 32 may include mostly dry and oxygen depleted air (i.e., approximately 89% nitrogen and 11% oxygen) which may be routed by the solid feedstock dryer 18 directly onto the solid feedstock 16 in order to dry the solid feedstock 16.

The system 30 also may reuse some of the water vapor removed from the feedstock dryer 18. For example, the collected water may be used by the IGCC component 14 as feed water, or the collected water may be reheated for use with the heat exchanger 34. In either case, the medium pressure steam 12 transfers heat into the intermediate heat transfer medium, e.g., gas 32.

A heat exchanger 36 may also be used to transfer thermal energy from the hot gas 32 for use in drying the solid feedstock 16. For example, the heat exchanger 36 may include a fin and tube heat exchanger, or tubes extending around or through the feedstock dryer 18, or a hollow wall for flowing the gas 32 around a holding area of the feedstock dryer 18. In one embodiment, the feedstock dryer 18 may be controlled by the controller 28 and include a closed vessel such as a drying chamber, a grinder, a pump, a passage, and a rotating dryer, among others. The dryer 18 may also include one or more passages designed to allow the steam 12 or the gas 32 to transfer heat to the solid feedstock as well as a vent used for venting the steam 12 or the gas 32 after removal of moisture from the solid feedstock. The dryer 18 may include an inlet coupled to the heat exchanger 36 that allows steam 12 or gas 32 to flow into the dryer 18. An outlet may also be coupled to the dryer 18 to allow for steam 12 or gas 32 to leave the dryer. In some embodiments, the steam 12 or gas 32 leaving the dryer 18 may be recirculated and reused, for example by routing the steam 12 or gas 32 back into the dryer 18 and/or the heat exchangers 34, 36. In other embodiments, the steam 12 or gas 32 may be routed to other plant components. The controller 28 may, for example, turn on a rotating dryer to dry the solid feedstock 16. Heat from the heat exchanger 36 may transfer thermal energy from the medium pressure steam 12 to the closed vessel enclosing the solid feedstock 16. The thermal energy may then transfer into the water in the solid feedstock 16, thereby evaporating the water away from the solid feedstock 16.

In another embodiment, the solid feedstock dryer 18 may include an open vessel such as a vat, or a storage bin, among others. The open vessel may surround the solid feedstock 16, which may receive the thermal energy from the medium pressure steam 12 and may use a similar evaporative method to remove moisture from the solid feedstock 16. In yet another embodiment, the solid feedstock dryer 18 may include a combination of open and closed vessels, which may be used to enclose and surround the solid feedstock 16 for drying. Any embodiments that are capable of using the thermal energy in steam to dry solids may be used.

In one embodiment, the controller 28 may adjust (e.g., increase or decrease) the heat transferred to the heat exchanger 36, the speed of the dry feedstock conveyor 24, and operational characteristics of the gasifier 26. For example, the controller 28 may increase or decrease the flow rate of medium pressure steam 12 through the heat exchanger 34, increase or decrease the flow rate of the gas 32 through the heat exchangers 34 and 36, selectively change between two or more different IGCC components 14 producing different medium pressure steams (e.g., different temperatures), increase or decrease the residence time of the solid feedstock 16 in the feedstock dryer 18, and adjust the grinding of the solid feedstock 16 to vary the moisture level of the feedstock 16 upstream of the gasifier 26. The controller 28 may receive a variety of sensor feedback relating to the IGCC component 14, the medium pressure steam 12, the hot gas 32, the solid feedstock 16, the feedstock dryer 18, and the gasifier 26. For example, the sensor feedback may include the temperature, pressure, moisture content, and other characteristics of the feedstock 16, as well as operational characteristics of the gasifier 26 (e.g., temperature and pressure). If the moisture content is not at a satisfactory level, then the controller 28 may adjust one or more parameters to increase or decrease the moisture content of the solid feedstock 16. Different gasifier types may be able to use fuels containing different moisture levels, for example, certain updraft gasifiers may be able to use fuel with moisture contents of less than approximately 5, 10, 20, 30, 40, 50, or 60 percent. Therefore, the solid feedstock 16 may be considered dry and ready for conveyance at different moisture levels depending on the type of gasifier 26.

In one embodiment, most of the thermal energy in the medium pressure steam 12 may be transferred by the heat exchanger 22 and used to dry the solid feedstock 16. The steam condensate may be further reused (e.g., as feed water for another plant component). The conveyance gas with the evaporated moisture can be reused after moisture has been removed and/or vented. In another embodiment, only some thermal energy in the medium pressure steam 12 may be transferred by the heat exchanger 36 and used to dry the solid feedstock 16, resulting in low pressure steam which may contain some thermal energy. The low pressure steam may be further directed to other plant components (e.g., as steam for use by a low pressure turbine).

Figure 3:
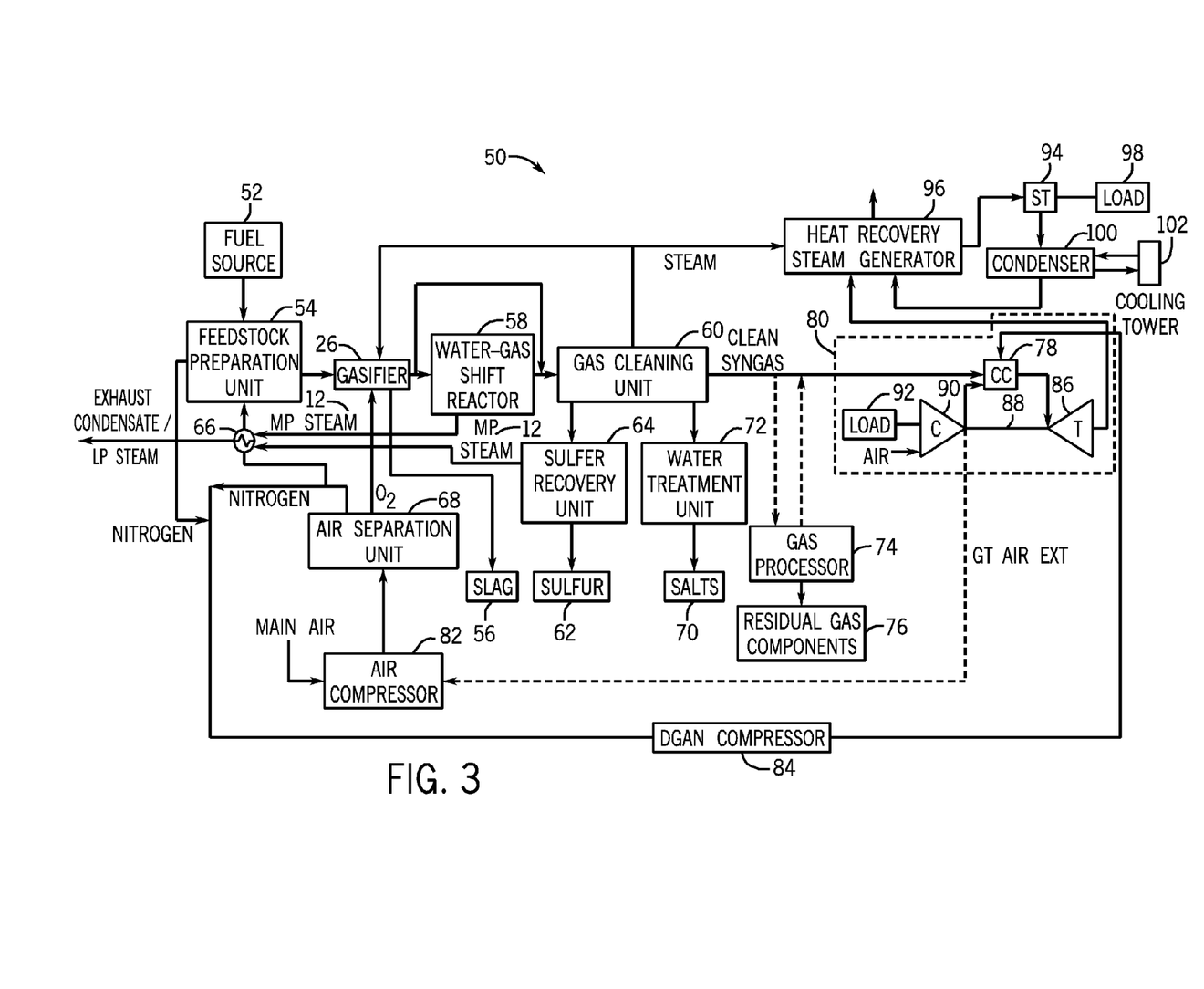
FIG. 3 depicts a block diagram of an embodiment of an integrated gasification combined cycle (IGCC) power plant utilizing medium pressure steam to dry solid fuel feedstock.

FIG. 3 is a block diagram of an embodiment of an integrated gasification combined cycle (IGCC) system 50 having components that produce medium pressure steam 12 for drying a fuel source 52. The fuel source 52 may include the solid feedstock 16 as shown in FIGS. 1 and 2, or any other suitable fuel source benefiting from drying or pre-heating upstream from the gasifier 26. Thus, the fuel source 52 may include a solid feedstock (e.g., 16), a liquid fuel, or some combination thereof. The fuel source 52 may include coal, petroleum coke, biomass, wood-based materials, agricultural wastes, tars, coke oven gas, and asphalt, or other carbon containing items.

The fuel source 52 may be passed to a feedstock preparation unit 54. The feedstock preparation unit 54 may include a feedstock dryer (e.g., 18) as discussed above with reference to FIGS. 1 and 2. Thus, in certain embodiments, the feedstock preparation unit 54 may dry and/or pre-heat the fuel source 52 using heat from medium pressure steam 12 originating with one or more components in the IGCC system 50. The feedstock prepared by the feedstock preparation unit 54 may be passed to the gasifier 26. The gasifier 26 may convert the feedstock into syngas, e.g., a combination of carbon monoxide and hydrogen. This conversion may be accomplished by subjecting the feedstock to a controlled amount of any moderator and oxygen at elevated pressures (e.g., from approximately 600 PSIG-1200 PSIG) and temperatures (e.g., approximately 2200° F.-2700° F.), depending on the type of gasifier 26 utilized. The heating of the feedstock during a pyrolysis process may generate a solid (e.g., char) and residue gases (e.g., carbon monoxide, hydrogen, and nitrogen). The char remaining from the feedstock from the pyrolysis process may only weigh up to approximately 30% of the weight of the original feedstock.

The combustion reaction in the gasifier 26 may include introducing oxygen to the char and residue gases. The char and residue gases may react with the oxygen to form carbon dioxide and carbon monoxide, which provides heat for the subsequent gasification reactions. The temperatures during the combustion process may range from approximately 2200° F. to approximately 2700° F. In addition, steam may be introduced into the gasifier 26. The gasifier 26 utilizes steam and limited oxygen to allow some of the feedstock to be burned to produce carbon monoxide and energy, which may drive a second reaction that converts further feedstock to hydrogen and additional carbon dioxide.

In this way, a resultant gas may be manufactured by the gasifier 26. The resultant gas may include approximately 85% of carbon monoxide and hydrogen, as well as $CH_4$, HCl, HF, COS, $NH_3$, HCN, and $H_2S$ (based on the sulfur content of the feedstock). This resultant gas may be termed "raw syngas." The gasifier 26 may also generate waste, such as a slag 56, which may be a wet ash material.

In certain embodiments, the dirty syngas may be passed on to a water-gas shift (WGS) reactor 58 to obtain a high hydrogen yield. The WGS reactor 58 may perform a water-gas shift reaction in which carbon monoxide reacts with water, (e.g., steam), to form carbon dioxide and hydrogen. This process may adjust the ratio of hydrogen to carbon monoxide in the raw syngas from approximately 1 to 1 to approximately 3 to 1 for further gas processing. Additionally, the WGS reactor 58 may generate medium pressure steam 12, which may be used to dry solid feedstock by the feedstock preparation unit 54 as described in more detail below with respect to FIG. 5. It should be noted that the WGS reactor 58 may be a sour WGS reactor, that is, sulfur may be present in the raw syngas fed into the WGS reactor 58 during the water-gas shift reaction.

A gas cleaning unit 60 may be utilized to clean the raw syngas. The gas cleaning unit 60 may scrub the raw syngas to remove the HCl, HF, COS, HCN, and $H_2S$ from the raw syngas, which may include the separation of $H_2S$ by an acid gas removal process. Elemental sulfur 62 may by recovered by the sulfur recovery unit 64 from the $H_2S$. As described in greater detail below with respect to FIG. 4, the sulfur recovery unit 64 may redirect medium pressure steam 12 into a heat exchanger 66 during the recovery of elemental sulfur 62. The heat exchanger 66 may heat nitrogen originating from an air separation unit (ASU) 68 and use the nitrogen to dry and/or pre-heat the fuel source 52 in the feedstock preparation unit 54. Nitrogen used in the feedstock preparation unit 54 may then be reused and redirected to the DGAN 84. Furthermore, the gas cleaning unit 60 may separate salts 70 from the raw syngas via a water treatment unit 72, which may utilize water purification techniques to generate usable salts 70 from the raw syngas. Subsequently, a clean syngas may be generated from the gas cleaning unit 60.

A gas processor 74 may be utilized to remove residual gas components 76 from the clean syngas, such as ammonia and methane, as well as methanol or other residual chemicals. However, removal of residual gas components 76 from the clean syngas is optional since the clean syngas may be utilized as a fuel even when containing the residual gas components 76 (e.g., tail gas). At this point, the clean syngas may include approximately 3%-40% CO, approximately up to 60% $H_2$, and approximately 10%-40% $CO_2$, and may be substantially stripped of $H_2S$. This clean syngas may be directed into a combustor 78 (e.g., a combustion chamber) of a gas turbine engine 80 as combustible fuel.

The IGCC system 50 may include the ASU 68 to separate air into component gases using, for example, cryogenic distillation techniques. The ASU 68 may separate oxygen from the air supplied to it from a supplemental air compressor 82 and may transfer the separated oxygen to the gasifier 26. Additionally, the ASU 68 may direct separated nitrogen to a diluent nitrogen (DGAN) compressor 84. The DGAN compressor 84 may compress the nitrogen received from the ASU 68 at least to pressure levels equal to those in the combustor 78, enabling injection into the combustion chamber. Thus, once the DGAN compressor 84 has adequately compressed the nitrogen to an adequate level, the DGAN compressor 84 may direct the compressed nitrogen to the combustor 78 of the gas turbine engine 80.

As described above, the compressed nitrogen may be transferred from the DGAN compressor 84 to the combustor 78 of the gas turbine engine 80. The gas turbine engine 80 may include a turbine 86, a drive shaft 88, and a compressor 90, as well as the combustor 78. The combustor 78 may receive fuel, such as the syngas, which may be injected under pressure from fuel nozzles. This fuel may be mixed with compressed air as well as compressed nitrogen from the DGAN compressor 84 and combusted within the combustor 78. This combustion may create hot pressurized exhaust gases.

The combustor 78 may direct the exhaust gases towards an exhaust outlet of the turbine 86. As the exhaust gases from the combustor 78 pass through the turbine 86, the exhaust gases may force turbine blades in the turbine 86 to rotate the drive shaft 88 along an axis of the gas turbine engine 80. As illustrated, the drive shaft 88 may be connected to various components of the gas turbine engine 80, including the compressor 90.

The drive shaft 88 may connect the turbine 86 to the compressor 90 to form a rotor. The compressor 90 may include blades coupled to the drive shaft 88. Thus, rotation of turbine blades in the turbine 86 may cause the drive shaft 88 connecting the turbine 86 to the compressor 90 to rotate blades within the compressor 90. The rotation of blades in the compressor 90 causes the compressor 90 to compress air received via an air intake in the compressor 90. The compressed air may then be fed to the combustor 78 and mixed with fuel and compressed nitrogen to allow for higher efficiency combustion. The drive shaft 88 may also be connected to a load 92, which may be a stationary load, such as an electrical generator, for producing electrical power in a power plant. Indeed, the load 92 may be any suitable device that is powered by the rotational output of the gas turbine engine 80.

The IGCC system 50 also may include a steam turbine engine 94 and a heat recovery steam generation (HRSG) system 96. The steam turbine engine 94 may drive a second load 98, such as an electrical generator for generating electrical power. However, both the first and second loads 92, 98 may be other types of loads capable of being driven by the gas turbine engine 80 and the steam turbine engine 94, respectively. In addition, although the gas turbine engine 80 and the steam turbine engine 94 may drive separate loads 92, 98, as shown in the illustrated embodiment, the gas turbine engine 80 and the steam turbine engine 94 may also be utilized in tandem to drive a single load via a single shaft. The specific configuration of the steam turbine engine 94, as well as the gas turbine engine 80, may be implementation-specific and may include any combination of sections.

Heated exhaust gas from the gas turbine engine 80 may be directed into the HRSG 96 and used to heat water and produce steam used to power the steam turbine engine 94. Exhaust from the steam turbine engine 94 may be directed into a condenser 100. The condenser 100 may utilize a cooling tower 102 completely condense steam from the steam turbine 94 discharge. In particular, the cooling tower 102 may provide cool water to the condenser 100 to aid in condensing the steam directed into the condenser 100 from the steam turbine engine 94. Condensate from the condenser 100 may, in turn, be directed into the HRSG 96. Again, exhaust from the gas turbine engine 80 may also be directed into the HRSG 96 to heat the water from the condenser 100 and produce steam.

As such, in combined cycle systems such as the IGCC system 50, hot exhaust may flow from the gas turbine engine 80 to the HRSG 96, where it may be used to generate high-pressure, high-temperature steam. The steam produced by the HRSG 96 may then be passed through the steam turbine engine 94 for power generation. In addition, the steam produced in the IGCC system 50 may also be supplied to any other process where steam may be used, such as to the feedstock preparation unit 54 for drying and/or pre-heating the fuel source 52.

Figure 4:
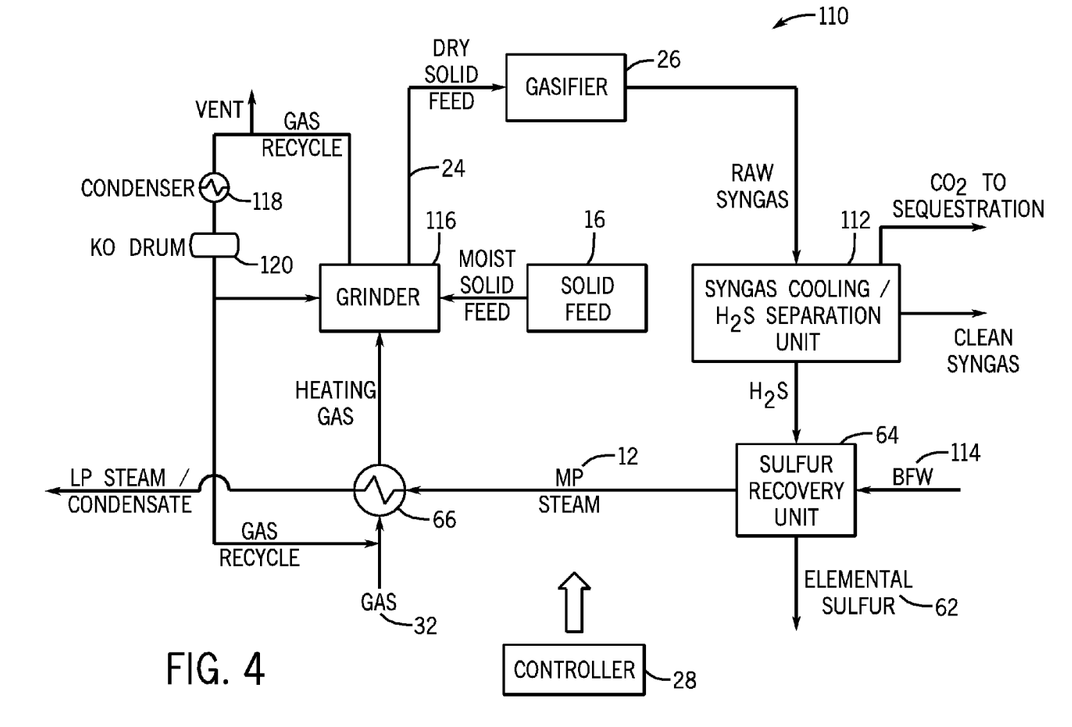
FIG. 4 depicts a block diagram of an embodiment of a solid feedstock processing section of an IGCC power plant depicted in FIG. 3 which includes a sulfur recovery unit and a feedstock grinder/dryer.

As mentioned above with respect to FIGS. 1, 2 and 3, various IGCC system 50 components such as the WGS reactor 58 and the sulfur recovery unit 64 may be used to supply medium pressure steam 12 for drying and/or pre-heating the fuel source 52 (e.g., solid feedstock 16). FIG. 4 illustrates a section 110 of an embodiment of the IGCC system 50 depicted in FIG. 3 that shows the sulfur recovery unit 64 as a source of medium pressure steam 12 that may be used to dry solid feedstock 16. More specifically, FIG. 4 illustrates an embodiment of a system which may first use dry solids as fuel in the gasifier 26, which may then produce raw syngas. The raw syngas may then be fed into a syngas gas cleaning unit 60 which may cool the raw syngas, remove $H_2S$ through an acid removal process, and produce clean syngas. The $H_2S$ may then be sent to the sulfur recovery unit 64 for conversion of the $H_2S$ into elemental sulfur. The sulfur recovery unit 64 generates medium pressure steam 12 by using, for example, a boiler feed water (BFW) 114 as a water feed to a Claus unit and/or a tail gas unit. Sulfur recovery reactions such as the Claus reaction are exothermic and may be well suited to produce a range of medium pressure steam 12, (e.g., steam at approximately 450° F. to 520° F. and having a pressure of approximately 400 PSIG to 800 PSIG) from the sulfur recovery unit 64. Accordingly, the sulfur recovery unit 64 may include a variety of heat exchangers to transfer heat from the sulfur recovery reaction to the boiler feed water to 114, thereby producing the medium pressure steam 12.

The medium pressure steam 12 produced by the sulfur recovery unit 64 may then be directed to the heat exchanger 66 for use in drying and/or pre-heating the solid feedstock 16. As appreciated, the medium pressure steam 12 may be used to transfer heat to the solid feedstock 16 indirectly with an intermediate heat transfer medium (e.g., gas 32) as illustrated in FIGS. 2 and 4, or more directly via a heat exchanger (e.g., 22) in direct contact with the solid feedstock 16 as illustrated in FIG. 1. In the illustrated embodiment of FIG. 4, the hot gas 32 from the heat exchanger 66 may be fed into a solid feedstock dryer component (e.g., a grinder 116), which may be used to both grind and remove moisture from the solid feedstock 16. Hot gas 32 may include nitrogen produced by an air separation unit 68 (shown in FIG. 3), air, carbon dioxide ($CO_2$), or superheated steam, among others.

Hot gas 32 may enter the grinder 116 and may transfer thermal energy into the solid feedstock 16 via either direct contact or through a heat transfer medium. For example, in certain embodiments, the grinder 116 may enable the hot gas 32 to flow directly over the solid feedstock 16, and evaporate the moisture directly from the solid feedstock 16 into the hot gas 32. By further example, the grinder 16 may include one or more closed passages (e.g., chambers, pumps, tubes, hollow wall, etc.) passing directly through or around a grinding chamber, thereby isolating the gas 32 from the solid feedstock 16 while enabling heat transfer through walls of the closed passages. In such an embodiment, the hot gas 32 does not collect moisture from the solid feedstock 16, but rather the heat transfer to the solid feedstock 16 causes evaporation of the moisture for separate removal. For example, a separate gas flow (e.g., air flow) may drive the moisture away from the grinder 116, and thus the solid feedstock 16.

As the hot gas 32 transfers heat directly or indirectly to the solid feedstock 16, the gas 32 cools and exits from the grinder 116 as cooled gas 32 for recycling or venting to atmosphere. If the cooled gas 32 is to be recycled, then a condenser 118 may be used to condense the moisture that may have accumulated in the gas 32 and a knock out (KO) drum 120 may be used to collect the condensed moisture from the gas 32. The cooled gas 32 may then be recycled back for use by the heat exchanger 66. As the medium pressure steam 12 transfers heat to the gas 32 in the heat exchanger 66, the moisture in the steam 12 may condense to produce a condensate. Condensate and/or low pressure steam may be routed to other IGCC system 50 components, such as a boiler, HRSG 96, or steam turbine 94. The dry solid feedstock 16 resulting from the drying process may then be conveyed by the dry feedstock conveyor 24 into the gasifier 26 for use as gasification fuel.

Figure 5:
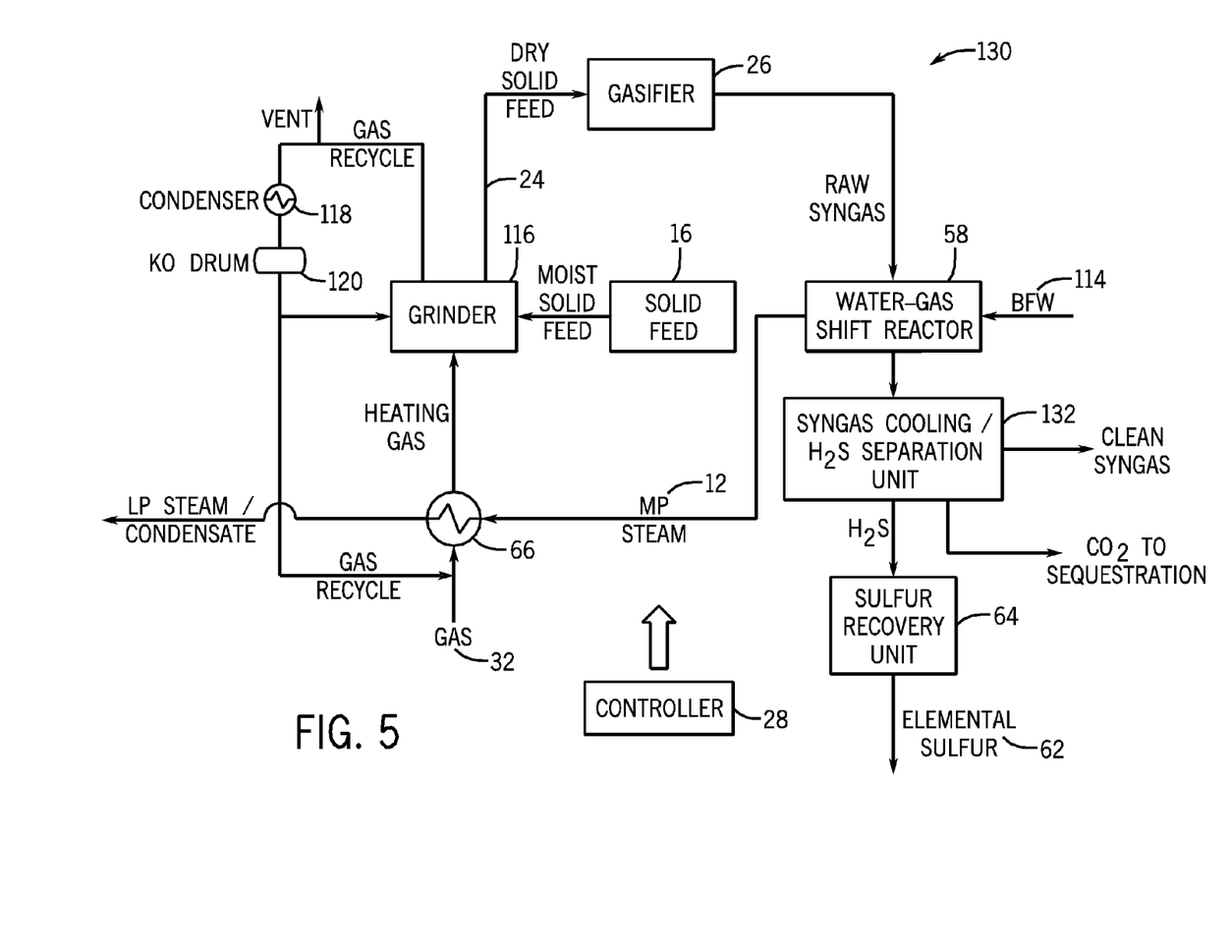
FIG. 5 depicts a block diagram of an embodiment of a solid feedstock processing section of an IGCC power plant depicted in FIG. 3 which includes a water-gas shift reactor and a feedstock grinder/dryer.

FIG. 5 is a diagram of a section 130 of an embodiment of the IGCC system 50 depicted in FIG. 3, illustrating the WGS reactor 58 as a source of medium pressure steam 12 that may be used in drying and/or pre-heating fuel (e.g., solid feedstock 16). As illustrated in FIG. 5, the gasifier 26 receives and gasifies the solid feedstock 16 to produce a raw syngas. The raw syngas flows into the WGS reactor 58, which may adjust the ratio of hydrogen and carbon monoxide in the syngas to a ratio of approximately 3:1 to obtain higher hydrogen yields. The water-gas shift reaction is an exothermic reaction that reacts carbon monoxide (CO) with water (e.g., steam) to form carbon dioxide ($CO_2$) and hydrogen. The raw syngas then flows into a gas cleaning unit 60, which cools the raw syngas and separates carbon dioxide and hydrogen sulfide ($H_2S$) to generate clean syngas. In certain embodiments, the separated carbon dioxide may be used for carbon dioxide sequestration, enhanced oil recovery, or other applications. The hydrogen sulfide passes to the sulfur recovery unit 64 for recovery of elemental sulfur 62.

In the illustrated embodiment, the water-gas shift reaction is an exothermic reaction that is particularly well suited for producing a range of medium pressure steam 12 (e.g., steam at approximately 450° F. to 520° F. and having a pressure of approximately 400 PSIG to 800 PSIG). Accordingly, the illustrated WGS reactor 58 may generate medium pressure steam 12 from a feed water (e.g., boiler feed water 114), as heat transfers from the water-gas shift reaction to the feed water 114 for cooling purposes. In certain embodiments, the boiler feed water 114 passes through a heat exchanger (e.g., cooling coils) inside the WGS reactor 58. However, any suitable heat transfer medium may be used to transfer heat from the water-gas shift reaction to the feed water 114 to cool the WGS reactor 58 and generate medium pressure steam 12.

The medium pressure steam 12 produced by the WGS reactor 58 may then be directed to the heat exchanger 66 for use in drying and/or pre-heating the solid feedstock 16. As appreciated, the medium pressure steam 12 may be used to transfer heat to the solid feedstock 16 indirectly with an intermediate heat transfer medium (e.g., gas 32) as illustrated in FIGS. 2, 4, and 5, or more directly via a heat exchanger (e.g., 22) in direct contact with the solid feedstock 16 as illustrated in FIG. 1. In the illustrated embodiment, the hot gas 32 from the heat exchanger 66 may be fed into a solid feedstock dryer component (e.g., a grinder 116), which may be used to both grind and remove moisture from the solid feedstock 16. Hot gas 32 may include nitrogen produced by an air separation unit 68 (shown in FIG. 3), air, carbon dioxide ($CO_2$), or superheated steam, among others.

Hot gas 32 may enter the grinder 116 and may transfer thermal energy into the solid feedstock 16 via either direct contact or through a heat transfer medium. For example, in certain embodiments, the grinder 116 may enable the hot gas 32 to flow directly over the solid feedstock 16, and evaporate the moisture directly from the solid feedstock 16 into the hot gas 32. By further example, the grinder 16 may include one or more closed passages (e.g., tubes, hollow wall, etc.) passing directly through or around a grinding chamber, thereby isolating the gas 32 from the solid feedstock 16 while enabling heat transfer through walls of the closed passages. In such an embodiment, the hot gas 32 does not collect moisture from the solid feedstock 16, but rather the heat transfer to the solid feedstock 16 causes evaporation of the moisture for removal separate from the hot gas 32. For example, a separate gas flow (e.g., air flow) may drive the moisture away from the grinder 116, and thus the solid feedstock 16.

As the hot gas 32 transfers heat directly or indirectly to the solid feedstock 16, the gas 32 cools and exits from the grinder 116 as cooled gas 32 for recycling or venting to atmosphere. If the cooled gas 32 is to be recycled, then a condenser 118 may be used to condense the moisture that may have accumulated in the gas 32 and a knock out (KO) drum 120 may be used to collect the condensed moisture from the gas 32. The cooled gas 32 may then be recycled back for use by the heat exchanger 66. As the medium pressure steam 12 transfers heat to the gas 12 in the heat exchanger 66, the moisture in the steam 12 may condense to produce a condensate and/or low pressure steam. The condensate and/or low pressure steam may be routed to other IGCC system 50 components, such as a boiler, HRSG 96, or steam turbine 94. The dry solid feedstock 16 resulting from the drying process may then be conveyed by the dry feedstock conveyor 24 into the gasifier 26 for use as gasification fuel.

It should be understood that the medium pressure steam 12 supply lines coming out of the WGS reactor 58 of FIG. 5 and the sulfur recovery unit 64 of FIG. 4 may be joined to form a single medium pressure steam 12 supply line. Similarly, other IGCC system components that generate medium pressure steam 12 may have medium pressure steam 12 supply lines added and joined into a single medium pressure steam 12 supply line. This single medium pressure steam 12 supply line may then be used by embodiments described above to dry and/or pre-heat the fuel source 52 (e.g., solid feedstock 16). It should also be understood that the sources of medium pressure steam 12 may be independently selectable to provide different medium pressure steams (e.g., steam at different pressures and temperatures). For example, the medium pressure steam 12 provided by the WGS reactor 58 of FIG. 5 may be at a different pressure and temperature as the medium pressure steam 12 provided by the sulfur recovery unit 64. Both medium pressure steam 12 sources 58, 64, as well as other medium pressure steam 12 sources, may then independently provide medium pressure steam 12.

FIGS. 4 and 5 also depict a controller 28 which may be provided to increase or decrease the heat transfer to the fuel source 52 (e.g., solid feedstock 16). The controller 28 may include hardware and/or logic encoded on a machine-readable medium or memory, a processor, and so forth. The controller 28 may adjust (e.g., increase or decrease) the heat transfer from the medium pressure steam 12 to the gas 32, the heat transfer from the gas 32 to the solid feedstock 16, the speed of the dry feedstock conveyor 24 (e.g., a gas-entrained solids conveyor), and operational characteristics of the gasifier 26. In particular, the controller 28 may increase or decrease the flow rate of the medium pressure steam 12 and the gas 32 through the heat exchanger 66, selectively change between two or more different IGCC components producing different medium pressure steams (e.g., different temperatures), increase or decrease the residence time of the solid feedstock 16 in the grinder 116, and adjust the grinding of the solid feedstock 16 to vary the moisture level of the feedstock 16 upstream of the gasifier 26. The controller 28 may receive a variety of sensor feedback relating to the IGCC component (e.g., WGS reactor 58 or sulfur recovery unit 64), the medium pressure steam 12, the solid feedstock 16, the grinder 116, and the gasifier 26. For example, the sensor feedback may include the temperature, pressure, moisture content, and other characteristics of the feedstock 16, as well as operational characteristics of the gasifier 26 (e.g., temperature and pressure). If the moisture content is not at a satisfactory level, then the controller 28 may adjust one or more parameters to increase or decrease the moisture content of the solid feedstock 16.

Technical effects of the invention include providing systems and methods for drying solid feedstock by reusing energy from existing plant components. In particular, as described above, medium pressure steam may be redirected from existing plant components, such as a water-gas shift reactor and/or a sulfur recovery unit, and used to dry solid feedstock. The disclosed embodiments may be part of new installations or, alternatively, may be implemented as retrofit additions to existing solid fuel preparation systems. In addition, the disclosed embodiments may be applied to any other applications that use a steam to dry a solid feed.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A system, comprising:
   a non-slurry solid feedstock supply;
   a gasifier configured to receive a non-slurry solid feedstock from the non-slurry solid feedstock supply;
   a plant component configured to generate a medium pressure steam;
   a first heat exchanger fluidly coupled to the plant component by using a fluid conduit; and
   a controller communicatively coupled to the plant component and programmed to control the transfer of the medium pressure steam from the plant component to the first heat exchanger by using the fluid conduit so that the medium pressure steam has a pressure of approximately 75 to 900 pounds per square inch when exiting the plant component, and wherein the first heat exchanger is configured to transfer heat from the medium pressure steam to the non-slurry solid feedstock prior to receipt by the gasifier, and the controller is programmed to control the plant component to not let down the steam pressure prior to the medium pressure steam entering the first heat exchanger, wherein the plant component comprises at least one of a sulfur recovery unit, a shift reactor, or a combination thereof, disposed in an integrated gasification combined cycle (IGCC) plant, and wherein the plant component is disposed downstream from the gasifier.

2. The system of claim 1, wherein the medium pressure steam controlled by the controller has a temperature of approximately 320 to 534 degrees Fahrenheit when exiting the plant component.

3. The system of claim 2, wherein the medium pressure steam controlled by the controller has a pressure of approximately 400 to 800 pounds per square inch and a temperature of approximately 450 to 520 degrees Fahrenheit when exiting the plant component.

4. The system of claim 1, comprising a feedstock dryer having the first heat exchanger, and wherein the non-slurry solid feedstock supply comprises a solid feedstock grinder, and the controller is configured to control the first heat exchanger to transfer heat from the medium pressure steam to the solid feedstock grinder.

5. The system of claim 4, wherein the first heat exchanger comprises one or more closed steam passages controlled by the controller to be in thermal communication with the non-slurry solid feedstock to transfer heat from the medium pressure steam to the non-slurry solid feedstock.

6. The system of claim 1, wherein the first heat exchanger is controlled by the controller to transfer heat from the medium pressure steam to the gas; wherein the gas is controlled by the controller to transfer heat to the non-slurry solid feedstock.

7. The system of claim 6, comprising a second heat exchanger controlled by the controller to be in thermal communication with the solid feedstock to transfer heat from the gas to the non-slurry solid feedstock.

8. The system of claim 6, wherein the solid feedstock supply comprises a gas flow path routing the gas in direct contact with the non-slurry solid feedstock.

9. The system of claim 1, wherein the medium pressure steam comprises a pressure of approximately 40% to 100% of the pressure of steam produced by the plant component disposed in the IGCC plant.

* * * * *